United States Patent [19]
Seki et al.

[11] 3,825,351
[45] July 23, 1974

[54] AUTOMATIC SURFACE INSPECTION DEVICE FOR RUNNING OBJECT

[75] Inventors: Takeo Seki; Shigenori Kawamura, both of Kokubunji; Itsuji Maeda, Akishima; Akira Kaneko, Kokubunji, all of Japan

[73] Assignees: Hatachi Electronics Co., Ltd.; Nisshin Steel Co., both of Tokyo, Japan

[22] Filed: Jan. 19, 1973

[21] Appl. No.: 325,054

[52] U.S. Cl. .................. 356/200, 250/563, 356/210, 356/237
[51] Int. Cl. ............................................ G01n 21/32
[58] Field of Search ............ 250/219 DF, 562, 563; 356/200, 237, 209, 210

[56] References Cited
UNITED STATES PATENTS
3,515,488  6/1970  Houser .................... 250/219 DF X
3,609,380  9/1971  Shaw ........................ 250/219 DF Primary Examiner—Ronald L. Wibert
Assistant Examiner—F. L. Evans
Attorney, Agent, or Firm—Craig & Antonelli

[57] ABSTRACT

A device for automatically detecting defects on the surface of a running flat object by optically scanning the surface and converting the presence of the defects into variations in electrical signals, characterized in that the configuration of an optical system associated with the device is adapted to be changed as desired without changing the characteristics of the optical system.

5 Claims, 6 Drawing Figures

AUTOMATIC SURFACE INSPECTION DEVICE FOR RUNNING OBJECT

The present invention relates to a device for detecting such defects as irregularities, flaws and changes in luster on the surface of such flat objects as metal plates, sheets of paper and plastic boards in the manufacture thereof, or more in particular to a device for detecting the defects in the form of variations in electrical signal by scanning the surface of such objects with flying spots of light and by collecting the light reflected from the surface thereof by means of a light receiver for converting it into corresponding electrical signal.

An object of the present invention is to provide a device for detecting automatically defects on the surface of a running object characterized in that the optical system associated with the device which is provided according to the manufacturing condition or the plant layout is capable of being changed in configuration without changing the characteristics thereof.

The above and other objects, features and advantages will be made apparent by the detailed description taken in conjunction with the accompanying drawings, in which.

In order to guarantee the quality of completed steel sheets, it is necessary to eliminate any steel sheet with defects on the surface thereof in the last stage of manufacture.

In common practice, skilled inspectors identify such defects with a naked eye. This practice, however, has the disadvantages that it is impossible to obtain constant and stable results of inspection due to the personal differences between individuals and different physical conditions of a person with time, that it takes a long period of time to train a skilled inspector as the inspection requires high skill, and that the running speed of the object to be inspected is limited to a relatively low value.

Figure 1:
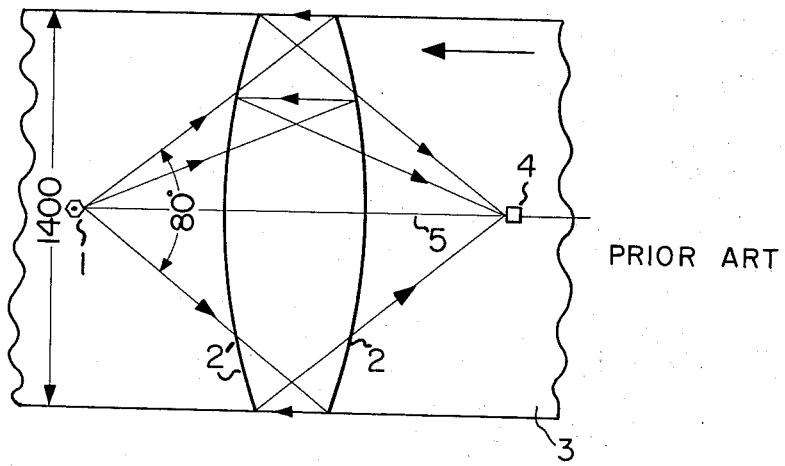
FIG. 1 is a schematic diagram showing a plan of a prior art device.
Figure 2:
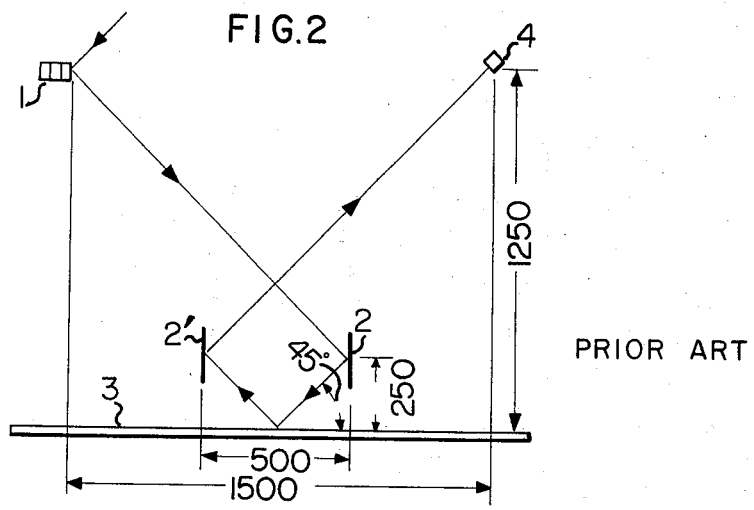
FIG. 2 is a front view of the prior art device shown in FIG. 1.
Figure 3:
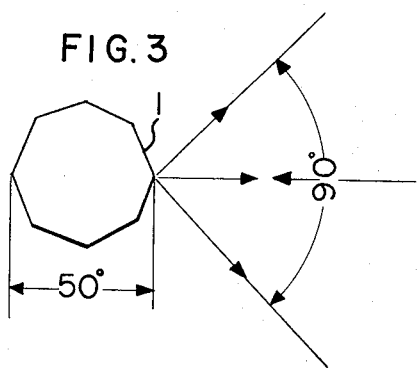
FIG. 3 shows a plan view of a rotary mirror for explaining the scanning angle.

A conventional inspection device as shown in FIGS. 1 and 2 is such that inspecting light is reflected on the surface of a flat object and the reflected light is converged on a concave mirror and applied to a light receiver whereby defects if any on the surface of the running flat object are detected in the form of variations in current. Referring to FIGS. 1 and 2, a beam of light produced from a light source (not shown) is reflected on a rotary mirror 1 which consists of a polyhedron for mechanical scanning and placed at the focal point of a concave mirror 2, and the reflected light is applied to a concave mirror 2 of a couple of opposedly placed concave mirrors 2 and 2' each with a parabolic longitudinal section and a linear cross section, then the light reflected from the concave mirror 2 is reflected further on the flat object 3 to be inspected. The resulting reflected light is again reflected on the other concave mirror 2' and converged in the light receiver 4 placed at the focal point of the concave mirror 2'.

In this way, variations in the light reflected from the object 3 which may be caused by defects if any on the surface of such object are detected in the form of variations in electrical signal by the light receiver 4.

For inspection of a relatively wide flat object by means of this device, it is necessary to enlarge the scanning angle. One method to achieve this purpose is to reduce the number of the faces of the rotary mirror 1. But too small a number of the faces of the rotary mirror 1 makes it difficult to scan the flat object 3 closely enough. On the other hand, enlargement of the spot diameter results in not only reduced accuracy of detection but increased end loss of the rotary mirror due to reduced effective scanning angle. For example, the scanning angle of 90° of a rotary mirror with eight faces and 50 mm in diagonal line length is reduced to about 80° in effective scanning angle even if by lessening the diameter of the spot to about 1 mm. As a result, the scanning of a steel plate of say 1,400 mm in width requires the focal length of 1,000 mm of the concave mirrors 2 and 2'. In the case of the layout that the distance between the two mirrors 2 and 2' is 500 mm and the angle of incidence to the flat object 3 is 45°, this necessitates the total dimension of the optical system of 1,250 mm height and 1,500 mm length as shown in FIG. 2, that is the size that makes it impossible to attach the optical system to a production line.

The present invention is intended to obviate the above disadvantages and will be explained below with reference to an embodiment shown in the attached drawings.

Figure 4:
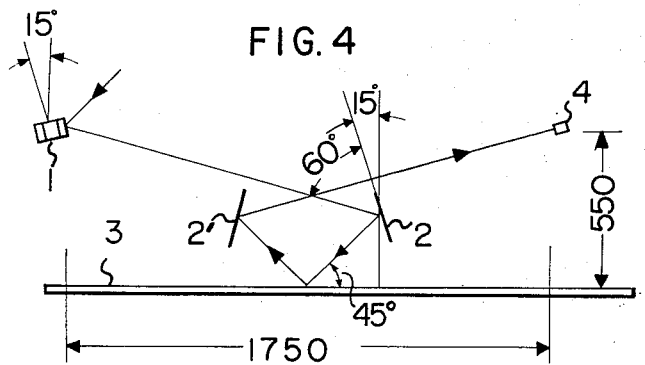
FIGS. 4, 5 and 6 are front views of the device according to the invention showing different arrangements thereof.

In FIG. 4, the longitudinal axes of the concave mirrors 2 and 2' are inclined inwardly opposedly with each other at an angle of 15° to the perpendicular axis of the flat object 3, while the reflecting faces of the rotary mirror 1 is placed at the focal point of the concave mirror 2, so that the faces of the rotary mirror 1 is made parallel with the longitudinal axis of the concave mirror 2 and the angle of incidence of 60° to the concave mirror 2 is obtained. In like manner, the light receiver 4 is positioned at the focal point of the concave mirror 2' and the optical axis of the receiver 4 is tilted into parallel with the direction of light reflected from the concave mirror 2'.

In this way, it is possible to maintain constant at 45° the angle of incidence of light to the flat object 3 to be scanned, resulting in a greatly reduced height of 550 mm in spite of the length of 1,750 mm.

Figure 5:
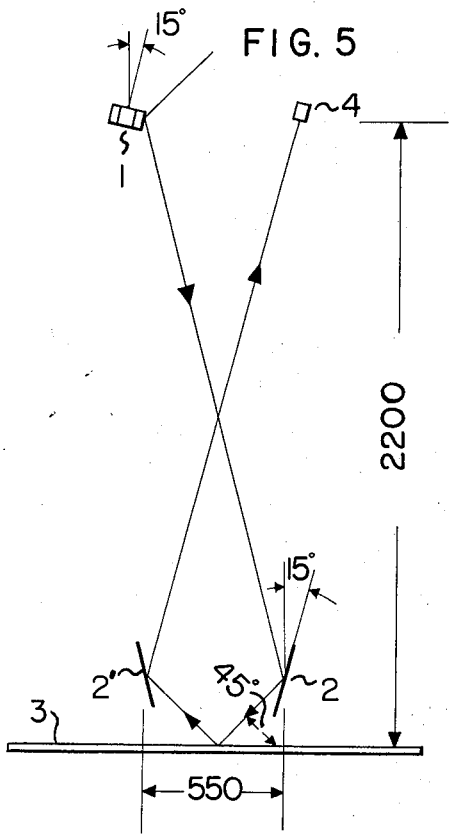

Referring to FIG. 5, the longitudinal axes of the opposed concave mirrors 2 and 2' are tilted outwardly at an angle of 15° to the perpendicular axis of the flat object 3, while the rotary mirror 1 and the light receiver 4 are positioned at the focal points of the concave mirrors 2 and 2' respectively so that the longitudinal axis of the concave mirror 2 and the light reflected from the concave mirror 2' are in parallel with the faces of the rotary mirror 1 and the optical axis of the light receiver 4, respectively.

In this case, in spite of the height of 2,200 mm, the length of the optical system is reduced to 550 mm.

Figure 6:
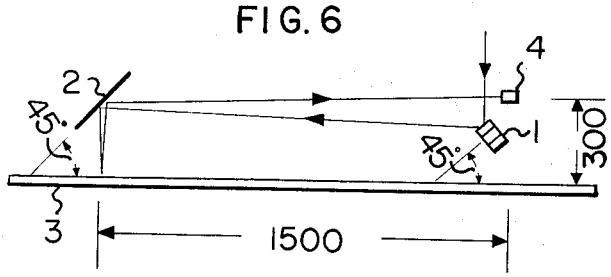

The embodiment of FIG. 6 is constructed in such a manner that the concave mirror 2 is used to scan the flat object almost at right angles, and includes the concave mirror 2 and the rotary mirror 1 at the focal point thereof both of which are inclined at 45°. This embodiment requires the length of 1,500 mm but the height thereof is reduced to less than 300 mm.

It will be seen from the above explanation that according to the present invention the configuration of the entire optical system can be changed as desired, without affecting in any way the characteristics of the optical system, only by tilting the faces of the rotary mirror 1 and the longitudinal axes of the concave mirrors 2 and 2' with respect to the flat object 3 to be scanned thereby to lighten the restrictions regarding the installation of the optical system in a production line.

We claim:

1. A device for automatic inspection of the surface of a running object comprising a pair of parabolic mirrors opposed to each other, each having a straight vertical section and a parabolic horizontal section, a polyhedral rotary mirror having a plurality of faces for reflecting and radiating a laser beam in a number of directions, said pair of parabolic mirrors being placed above a planar object to be inspected, said polyhedral rotary mirror being positioned at the focal point of one of said parabolic mirrors, said flat object being scanned by said laser beam in a straight line in a transverse direction to the direction of feed of said flat object after being reflected by said one parabolic mirror, and light receiving means for receiving and detecting said laser beam including flaw signals from the surface of the running object after being reflected by the other of said parabolic mirrors, said light receiving means being positioned at the focal point of the other of said parabolic mirrors, the longitudinal axes of said parabolic mirrors and the face of said polyhedral mirror being tilted at the same angle to the perpendicular axis of said flat running object thereby to change the configuration of the optical system as desired without affecting in any way the characteristics of the optical system.

2. A device as defined in claim 1 wherein the longitudinal axis of one of said parabolic mirrors and the face of said polyhedral rotary mirror are tilted in the same direction at an angle of 15° to the perpendicular axis of said flat running object.

3. A device as defined in claim 2 wherein said parabolic mirrors face said flat running object.

4. A device as defined in claim 2 wherein said parabolic mirrors face away from said flat running object.

5. A device for automatic inspection of the surface of a running flat object comprising a parabolic mirror having a straight vertical section and a parabolic horizontal section, a polyhedral rotary mirror having a plurality of faces for reflecting and radiating a laser beam in a number of directions, which is positioned at the focal point of said parabolic mirror, said flat object being scanned in a straight line in a transverse direction to the direction of feed of said flat object by the laser beam reflected by said parabolic mirror, and light receiving means for receiving and detecting said laser beam including flaw signals on the surface of the running object after being again reflected by said parabolic mirror, said light receiving means being positioned at the focal point of the parabolic mirror, in which the longitudinal axis of said parabolic mirror and the face of said polyhedral rotary mirror are tilted at the same angle to the perpendicular axis of said flat running flat object thereby to change the configuration of the optical system as desired without affecting in any way the characteristic of the optical system.

* * * * *

UNITED STATES PATENT OFFICE
CERTIFICATE OF CORRECTION

Patent No. 3,825,351          Dated July 23, 1974

Inventor(s) Takeo SEKI, Shigenori KAWAMURA, Itsuji MAEDA and Akira KANEKO

It is certified that error appears in the above-identified patent and that said Letters Patent are hereby corrected as shown below:

Title page as it reads now:

[73] Assignees: Hatachi Electronics Co., Ltd.;
                          Nisshin Steel Co., both of Tokyo, Japan Title page as it should read:

[73] Assignees: Hitachi Electronics Co., Ltd.;
                          Nisshin Steel Co., Ltd., both of Tokyo, Japan Signed and sealed this 4th day of February 1975.

(SEAL)
Attest:

McCOY M. GIBSON JR.          C. MARSHALL DANN
Attesting Officer             Commissioner of Patents